(12) United States Patent
Ta et al.

(10) Patent No.: US 10,480,619 B2
(45) Date of Patent: *Nov. 19, 2019

(54) RING GEAR, GEAR DEVICE AND MOLD FOR MANUFACTURING THE RING GEAR

(71) Applicant: JOHNSON ELECTRIC INTERNATIONAL AG, Murten (CH)

(72) Inventors: Jing Ning Ta, Hong Kong (CN); Lap Wah Lo, Hong Kong (CN); Xing Ju Yi, Shenzhen (CN); Qiu Mei Li, Shenzhen (CN)

(73) Assignee: Johnson Electric International AG, Murten (CH)

( * ) Notice: Subject to any disclaimer, the term of this patent is extended or adjusted under 35 U.S.C. 154(b) by 0 days.

This patent is subject to a terminal disclaimer.

(21) Appl. No.: 15/660,321

(22) Filed: Jul. 26, 2017

(65) Prior Publication Data

US 2018/0051777 A1    Feb. 22, 2018

(30) Foreign Application Priority Data

Aug. 22, 2016   (CN) .......................... 2016 1 0704012
Jun. 14, 2017   (CN) .......................... 2017 1 0449138

(51) Int. Cl.
*F16H 1/46* (2006.01)
*B22F 3/03* (2006.01)
(Continued)

(52) U.S. Cl.
CPC ................ *F16H 1/46* (2013.01); *B21J 5/025* (2013.01); *B21K 1/30* (2013.01); *B21K 1/305* (2013.01);
(Continued)

(58) Field of Classification Search
CPC . F16H 1/46; F16H 57/12; F16H 57/08; F16H 55/17; F16H 2055/176; B21J 5/025; B21K 1/305; B21K 1/30; B22F 5/08
(Continued)

(56) References Cited

U.S. PATENT DOCUMENTS 5,096,037 A * 3/1992 Knoess ..................... B22F 5/08
                                                       192/108
5,662,545 A * 9/1997 Zimmerman ......... B05B 3/0422
                                                       29/893.1
(Continued)

FOREIGN PATENT DOCUMENTS

DE     102005033921 A1    1/2007
WO     WO1997045219 A1    12/1997

*Primary Examiner* — Roger L Pang
(74) *Attorney, Agent, or Firm* — Muncy, Geissler, Olds & Lowe, P.C.

(57) ABSTRACT

The present invention provides a ring gear and a gear reduction device. The ring gear includes a one-piece annular body made from powder metallurgy material, and a first ring gear part and a second ring gear part formed on a surface of the annular body. The first ring gear part and the second ring gear part are arranged along an axial direction of the annular body. The ring gear has a density that is less than 92% of its theoretical density and in the range of 6.0 to 8.0 grams per cubic centimeter. The present invention further provides a mold for manufacturing the ring gear. The ring gear of the present invention includes two ring gears integrally formed at once, and the two ring gears have improved concentricity.

2 Claims, 11 Drawing Sheets

(51) Int. Cl.
  *B22F 5/08*   (2006.01)
  *F16H 55/17*  (2006.01)
  *F16H 57/08*  (2006.01)
  *B21K 1/30*   (2006.01)
  *B21J 5/02*   (2006.01)

(52) U.S. Cl.
  CPC ............... *B22F 3/03* (2013.01); *B22F 5/08* (2013.01); *F16H 55/17* (2013.01); *F16H 57/08* (2013.01); *F16H 2055/176* (2013.01)

(58) Field of Classification Search
  USPC .................................................. 475/344, 330
  See application file for complete search history.

(56) References Cited

U.S. PATENT DOCUMENTS

| | | | |
|---|---|---|---|
| 6,379,276 B1* | 4/2002 | Cheng | F16H 37/0826 |
| | | | 475/330 |
| 7,160,351 B2* | 1/2007 | Trasorras | B22F 3/164 |
| | | | 75/246 |
| 7,854,995 B1 | 12/2010 | Anderson | |
| 2004/0062673 A1 | 4/2004 | Trasorras et al. | |
| 2005/0244295 A1 | 11/2005 | Skoglund et al. | |
| 2009/0129964 A1 | 5/2009 | David et al. | |
| 2013/0269305 A1 | 10/2013 | Wang et al. | |
| 2013/0274049 A1* | 10/2013 | Zhu | A63B 55/61 |
| | | | 475/149 |
| 2014/0135165 A1 | 5/2014 | Kruselburger | |
| 2015/0105208 A1* | 4/2015 | Hagedorn | E05F 15/614 |
| | | | 475/149 |
| 2016/0298730 A1* | 10/2016 | Matsuda | F16H 57/082 |
| 2018/0051790 A1* | 2/2018 | Zhu | F16H 1/46 |
| 2018/0051791 A1* | 2/2018 | Ta | F16H 1/28 |
| 2018/0202517 A1* | 7/2018 | Jang | B60T 13/74 |

* cited by examiner

RING GEAR, GEAR DEVICE AND MOLD FOR MANUFACTURING THE RING GEAR

CROSS REFERENCE TO RELATED APPLICATIONS

This non-provisional patent application claims priority under 35 U.S.C. § 119(a) from Patent Application No. 201710449138.3 filed in The People's Republic of China on 14 Jun. 2017 and Patent Application No. 201610704012.1 filed in The People's Republic of China on 22 Aug. 2016.

FIELD OF THE INVENTION

This invention relates to the field of gears, and in particular to a ring gear and a gear device using the ring gear.

BACKGROUND OF THE INVENTION

In a conventional two-stage gear reduction device, a ring gear of a first planetary gear train and a ring gear of a second planetary gear train are usually separately formed. In general, each ring gear has connection portions which are machined after the ring gear is formed, and the connection portions of the two ring gears are connected together via fasteners such as screws or pins. The ring gears fabricated in this manner require secondary machining and subsequent mechanical connection and thus have a high cost. In addition, eccentricity between the two ring gears may easily occur due to the fabrication or assembly process.

SUMMARY OF THE INVENTION

An objective of the present invention is to improve the concentricity of the ring gear.

One aspect of the present invention provides a ring gear. The ring gear comprises a first ring gear part comprising a first annular body and a plurality of first teeth formed on a surface of the annular body; and a second ring gear part comprising a second annular body and a plurality of second teeth formed on a surface of the second annular body. The first ring gear part and the second ring gear part are integrally formed from powder metal. The ring gear has a density that is less than 92% of its theoretical density and in the range of 6.0 to 8.0 grams per cubic centimeter.

Preferably, the ring gear has a density of 6.2 to 7.2 grams per cubic centimeter.

Preferably, the first teeth are helical teeth, and the second teeth are straight teeth.

Preferably, the first teeth are straight teeth, and the second teeth are helical teeth.

Preferably, the first teeth and the second teeth are both helical teeth with opposite helical directions.

Preferably, the first teeth and the second teeth are both helical teeth with the same helical direction.

Preferably, the first teeth and the second teeth are unequal in pitch.

Alternatively, the first teeth and the second teeth may be equal in pitch.

Preferably, the first teeth and the second teeth are unequal in tooth number.

Alternatively, the first teeth and the second teeth may be equal in tooth number.

Preferably, the first teeth and the second teeth are unequal in tooth height.

Alternatively, the first teeth and the second teeth may be equal in tooth height.

Preferably, the ring gear is integrally formed in a single mold cavity such that there is no connection mark between the first annular body of the first ring gear part and the second annular body of the second annular body.

Preferably, the ring gear has a smooth outer circumferential surface, that is, there is no connection line.

Preferably, pores are formed between powder metallurgy particles of the ring gear, and a maximum size of long sides of the pores is less than 0.2 mm.

Preferably, the first annular body forms a plurality of mounting portions in each of which a through hole is defined, the mounting portions at least partly overlapped with the first teeth in an axial direction of the ring gear; and/or the second annular body forms a plurality of mounting portions in each of which a through hole is defined, the mounting portions at least partly overlapped with the second teeth in an axial direction of the ring gear.

The ring gear provided by the first aspect of the invention may be used in a gear device such as a planetary gear reduction device. The planetary gear device includes a first planetary gear train and a second planetary gear train. The first planetary gear train includes a first sun gear, a first planetary gear set surrounding the first sun gear, and a first carrier that is driven by revolution of the first planetary gear set about the first sun gear. Each planetary gear of the first planetary gear set meshes with both of the first sun gear and the first ring gear part on the inner circumferential surface of the ring gear. The second planetary gear train includes a second sun gear, a second planetary gear set surrounding the second sun gear, and a second carrier that is driven by revolution of the second planetary gear set about the second sun gear. Each planetary gear of the second planetary gear set meshes with both of the second sun gear and the second ring gear part on the inner circumferential surface of the ring gear.

Preferably, the gear device further comprising a flange mounted to an end of the ring gear, wherein the flange comprises a flange body abutting the end of the ring gear, and a connecting portion extending from the flange body and being inserted into inside of the ring gear.

Preferably, one of the first annular body and the second annular body forms a plurality of recessed mounting portions, the connecting portion forms a plurality of engaging portions protruding from an outer circumferential surface thereof, and the protruding engaging portions are respectively received in the recessed mounting portions.

Preferably, the connecting portion has a round circumferential surface configured to contact with tips of the teeth of the ring gear.

In another aspect, the present invention further provides a mold for manufacturing the above mentioned ring gear. The mold comprises an intermediate mold including a mold cavity; an upper punch including a first hollow upper punch body and a second upper punch body received in the first upper punch body; a lower punch including a first hollow lower punch body and a second lower punch body received in the first lower punch body, an outer diameter of the first lower punch body and an outer diameter of the first upper punch body matching with an inner diameter of the mold cavity of the intermediate mold, an outer diameter of the second lower punch body being equal to an outer diameter of the second upper punch body, each of the second lower punch body and the second upper punch body being formed with external meshing teeth.

Preferably, an outer surface of the second upper punch body is formed with helical teeth having a tooth profile corresponding to that of the first teeth of the ring gear, an inner surface of the first upper punch body is formed with helical teeth which mesh with the helical teeth of the second upper punch body.

The compound ring gear of the present invention is integrally formed into a single piece in a single mold cavity. Assembly of the first ring gear part and the second ring gear part is omitted, which avoids the secondary machining, reduces the cost, and improve the concentricity of the first ring gear part and the second ring gear part.

DETAILED DESCRIPTION OF THE PREFERRED EMBODIMENTS

Below, embodiments of the present invention will be described further with reference to the accompanying drawings.

Figure 1:
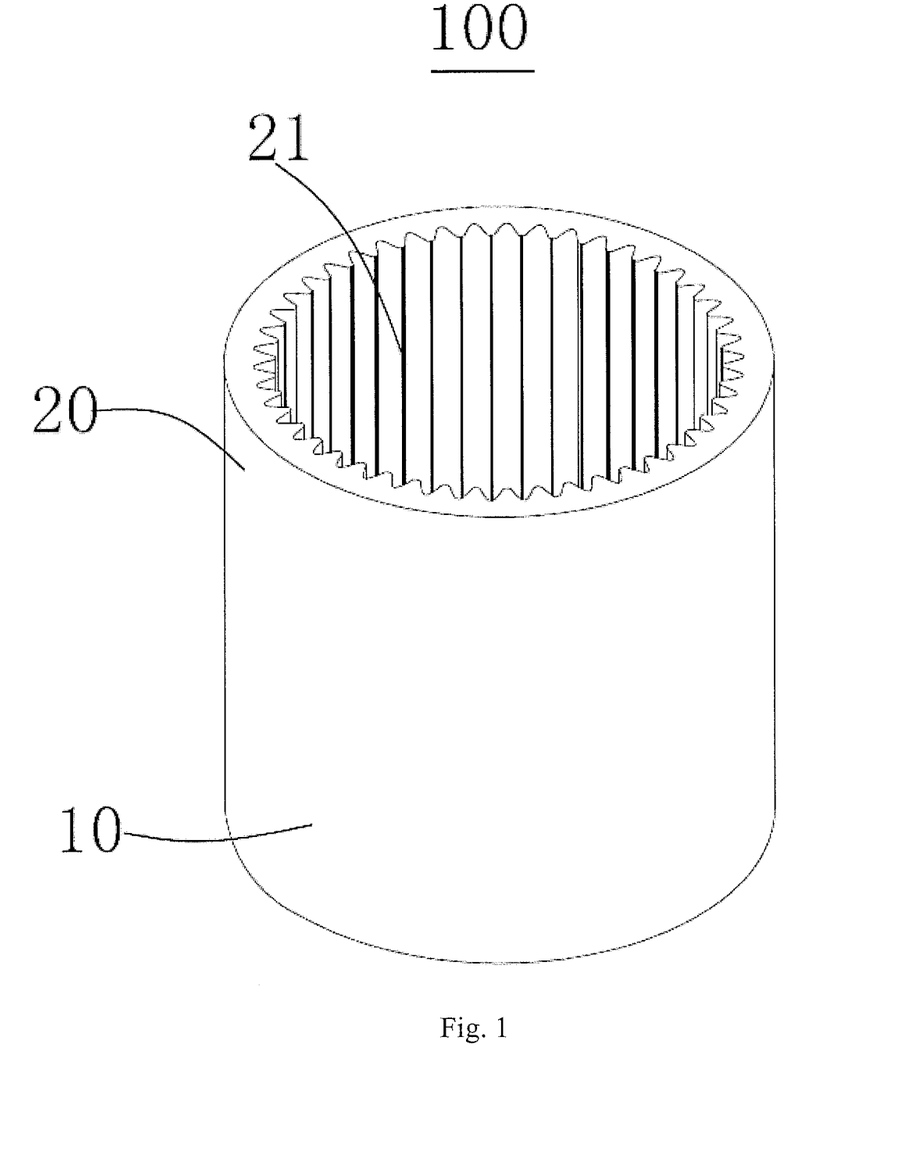
FIG. 1 illustrates a ring gear according to a first embodiment of the present invention.
Figure 2:
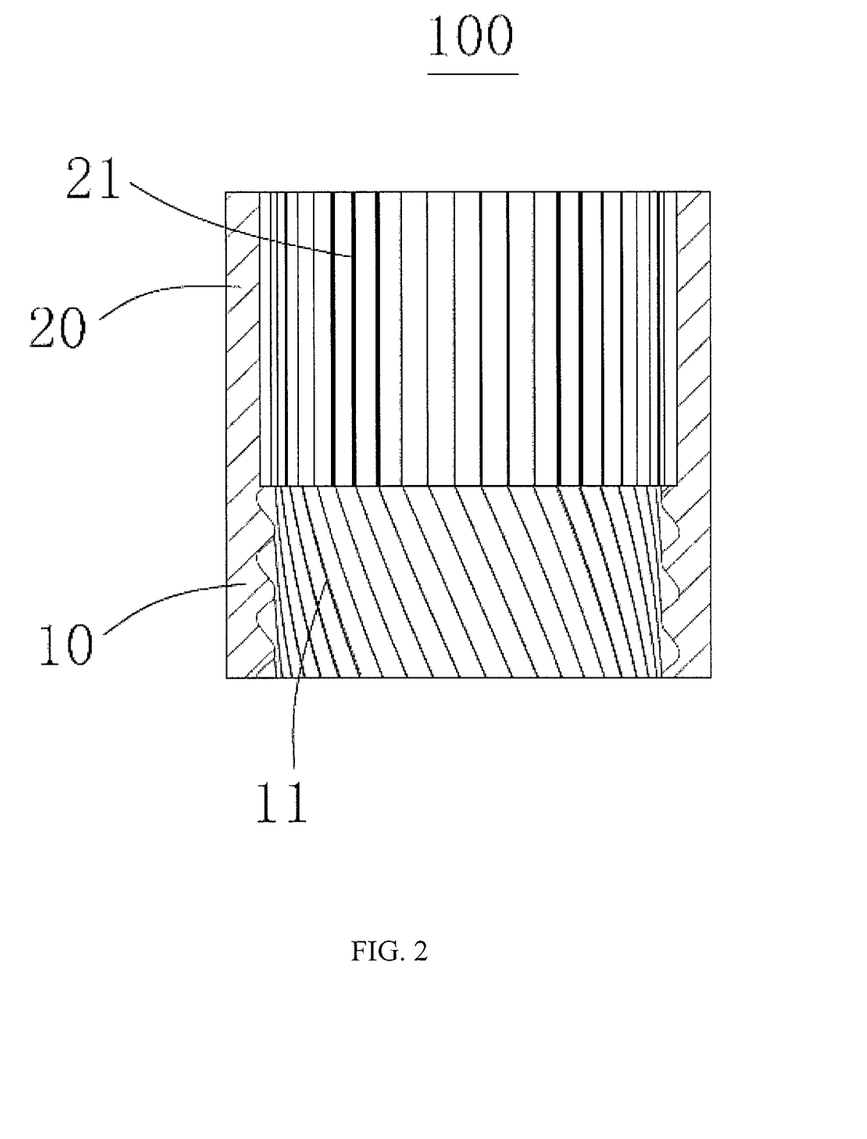
FIG. 2 is a sectional view of the ring gear of FIG. 1.

Referring to FIG. 1 and FIG. 2, the present invention provides a ring gear 100 made from a powder metallurgy material. Narrow and long pores are formed between powder metallurgy particles of the ring gear 100, and a maximum size of long sides of the narrow and long pores is less than 0.2 mm. In this embodiment, the ring gear 100 is a compound ring gear including a first ring gear part 10 and a second ring gear part 20. The first ring gear part 10 comprises a first annular body and a plurality of first teeth 11 formed on the inner surface of the first annular body. The second ring gear part 20 comprises a second annular body and a plurality of second teeth 21 formed on the inner surface of the second annular body. The first ring gear part 10 and the second ring gear part 20 are integrally formed. That is, the first and second annular bodies, the first teeth 11 and the second teeth 21 are integrally formed into a single piece with a monolithic structure. The first annular body of the first ring gear part 10 and the second annular body of the second ring gear part 20 are cooperatively formed to the annular body of the ring gear 100. In this embodiment, the teeth 11, 21 of the two stages of ring gear are formed on an inner circumferential surface of the annular body. In this embodiment, assembly of the first ring gear part 10 and the second ring gear part 20 is no longer required, which on one hand can avoid the secondary machining to the first ring gear part 10 and the second ring gear part 20, reduce an axial length of the ring gear 100 and reduce the cost, and on the other hand can avoid eccentricity due to errors during manufacturing or assembly the parts, thus improving the concentricity of the first ring gear part 10 and the second ring gear part 20.

Preferably, the ring gear 100 has a density that is less than 92% of its theoretical density, and in the range of 6.0 to 8.0 grams, and more preferably, 6.2 to 7.2 grams, per cubic centimeter.

The inner circumferential surface of the first ring gear part 10 is integrally formed with the first teeth 11. The inner circumferential surface of the second ring gear part 20 is integrally formed with the second teeth 21. Preferably, an axial inner end of the first teeth 11 is connected to an inner end of the second teeth 21, an axial outer end of the first teeth 11 is flush with an end of the annular body of the ring gear, and an axial outer end of the second teeth 21 is flush with an opposite end of the annular body of the ring gear. In an alternative embodiment, the inner end of the first teeth 11 and the inner end of the second teeth 21 may be disconnected, but instead spaced apart by an axial distance, i.e. a partition region without teeth is formed between the inner end of the first teeth 11 and the inner end of the second teeth 21, and the partition region has a smooth inner surface.

In this embodiment, the first teeth 11 and the second teeth 21 have the same tooth number, different tooth thickness and different tooth height. It should be understood that the first teeth 11 and the second teeth 21 may be unequal in tooth number, equal in tooth thickness and tooth height, which can be configured according to needs. A cross section of each first tooth 11 and/or each second tooth 21 is involute in shape and may alternatively be triangular, rectangular or trapezoidal.

In this embodiment, the first teeth 11 are helical teeth having a helical angle of 10° to 30°, preferably, 19°, 20° or 21°. The second teeth 21 are straight teeth, and an axial length of the first teeth 11 is less than an axial length of the second teeth 21.

It should be understood that the first teeth 11 and the second teeth 21 may be configured in another manner.

Figure 3:
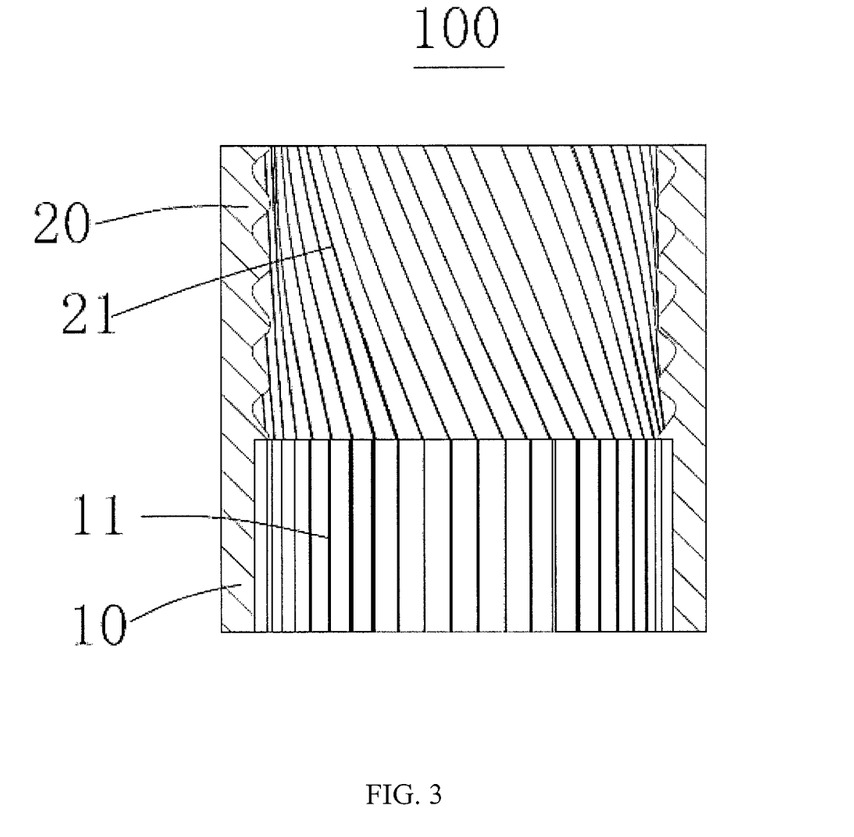
FIG. 3 is a sectional view of a ring gear according to a second embodiment of the present invention.

Referring to FIG. 3, in this embodiment, the first teeth 11 are straight teeth, the second teeth 21 are helical teeth having a helical angle of 10° to 30°, preferably, 19°, 20° or 21°. An axial length of the first teeth 11 is less than an axial length of the second teeth 21.

Figure 4:
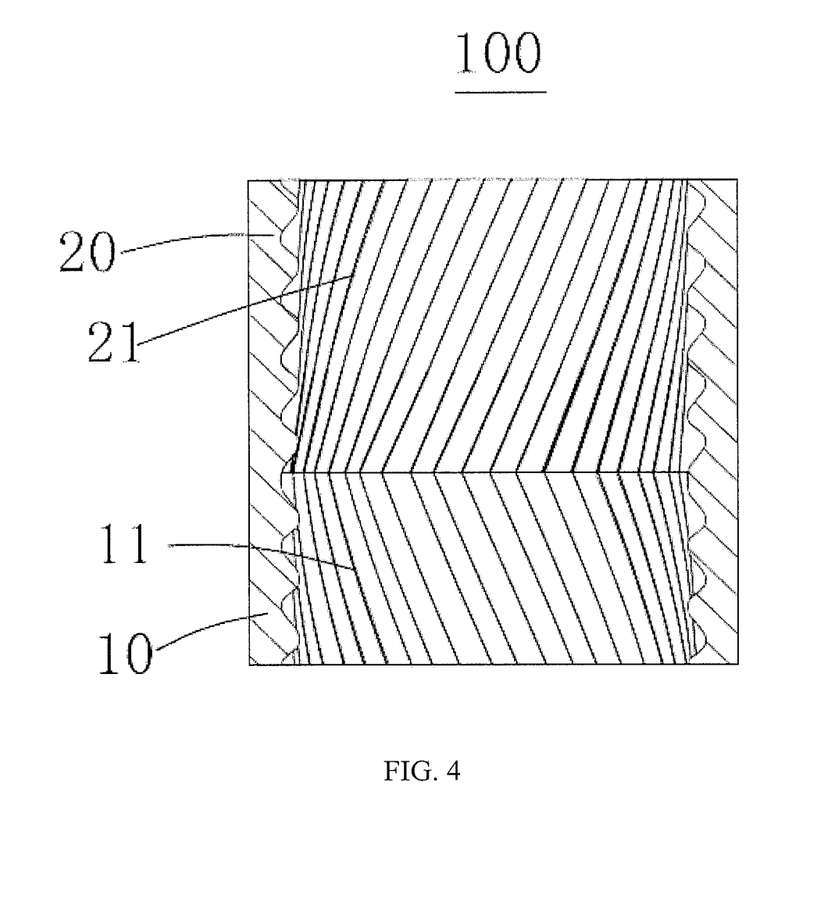
FIG. 4 is a sectional view of a ring gear according to a third embodiment of the present invention.

Referring to FIG. 4, in this embodiment, both the first teeth 11 and the second teeth 21 are helical teeth with the same helical angle but opposite helical directions, and an axial length of the first teeth 11 is less than an axial length of the second teeth 21. It should be understood that the axial length of the first teeth 11 may also be greater than the axial length of the second teeth 21.

Figure 5:
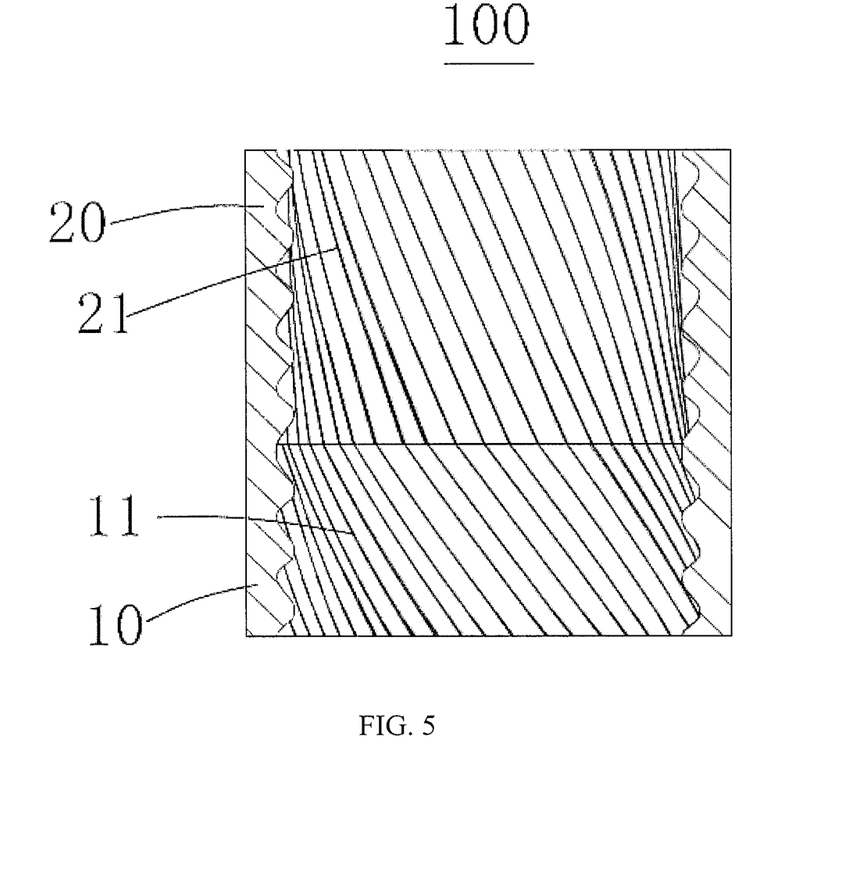
FIG. 5 is a sectional view of a ring gear according to a fourth embodiment of the present invention.

Referring to FIG. 5, in this embodiment, both the first teeth 11 and the second teeth 21 are helical teeth with the same helical direction but different helical angles. The helical angle of the first teeth 11 is greater than the helical angle of the second teeth 21, and an axial length of the first teeth 11 is less than an axial length of the second teeth 21. It should be understood that the helical angle of the first teeth 11 may also be less than the helical angle of the second teeth 21, and the axial length of the first teeth 11 may also be greater than the axial length of the second teeth 21.

It should be understood that the first teeth 11 and the second teeth 21 may be both disposed on an outer circumferential surface of the annular body, or one disposed on the outer circumferential surface and the other disposed on the inner circumferential surface of the annular body.

It should be understood that the first teeth 11 and the second teeth 21 may be equal or unequal in tooth number and tooth height. Slots between the first teeth 11 of the first ring gear part 10 may be aligned and in communication with slots between the second teeth 21 of the second ring gear part 21. Alternatively, the slots may not be aligned or in communication with each other.

Preferably, the density of the ring gear 100 is less than 92% of its theoretical density, and is in the range of 6.0 to 8.0 grams per cubic centimeter, for facilitating integrally forming the ring gear. The first ring gear part 10 with the first teeth 11 and the second ring gear part 20 with the second teeth 21 are integrally formed as a single one-piece at once, which means the first ring gear part 10 and the second ring gear part 20 are not separately formed. Thus, manufacturing efficiency is increased and the concentricity of the first ring gear part 10 and the second ring gear part 20 is improved. The density of the ring gear 100 may be uniform or non-uniform.

Figure 6:
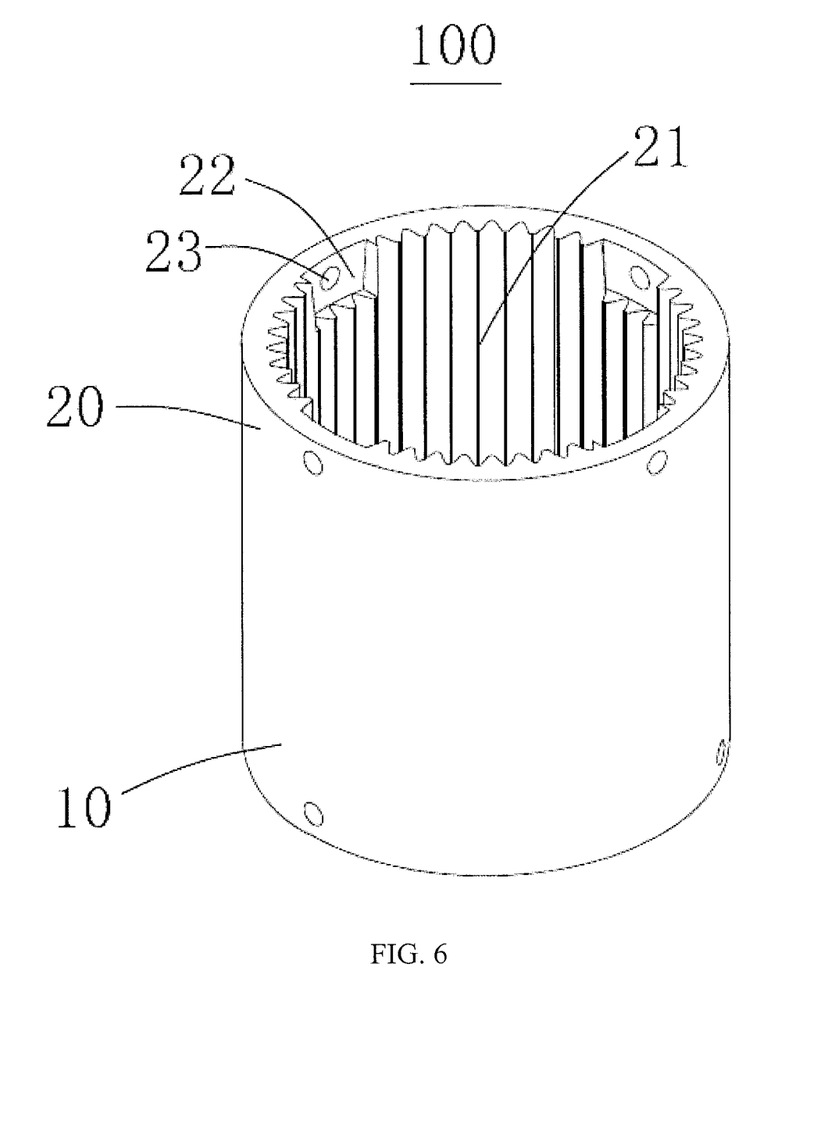
FIG. 6 illustrates a ring gear according to a fifth embodiment of the present invention, a first ring gear part and a second ring gear part of the ring gear integrally formed with portions for connecting flanges, respectively.
Figure 7:
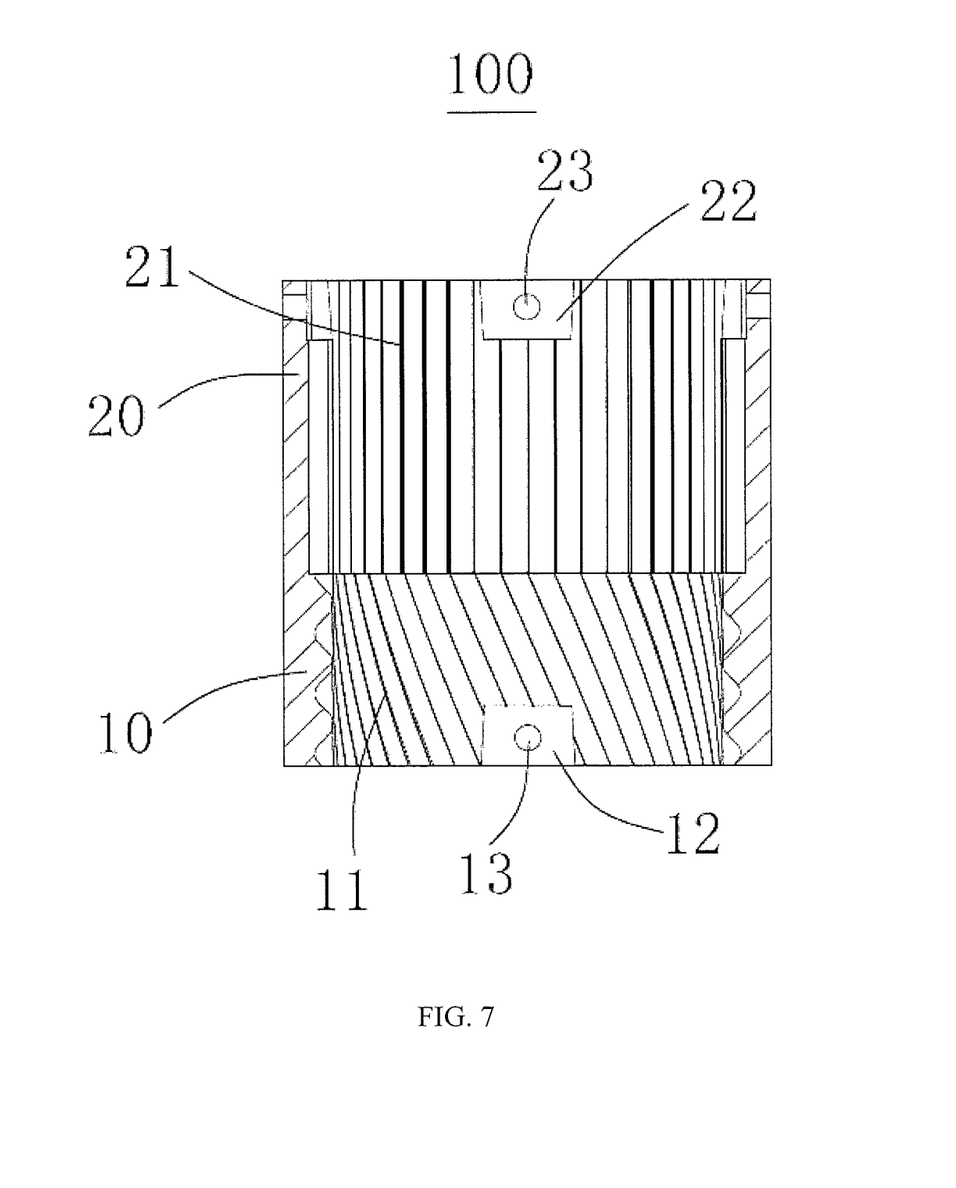
FIG. 7 is a sectional view of the ring gear of FIG. 6, the first ring gear part and the second ring gear part of which integrally formed with the portions for connecting flanges, respectively.

Referring to FIG. 6 and FIG. 7, in another embodiment of the present invention, the first ring gear part 10 and the second ring gear part 20 are further integrally formed with mounting portions 12, 22 for connecting to flanges. In particular, the inner circumferential surface of the first ring gear part 10 is further integrally formed with a plurality of first recessed mounting portions 12. Preferably, the first recessed mounting portions 12 extend to the axial end of the first ring gear part 10. The first recessed mounting portion 12 has a mounting surface 14. The radial depth of the recessed mounting portion 12 is equal to or greater than the radial height of the first teeth 11. A first through hole 13 may be defined in each first recessed mounting portion 12, and the first through hole 13 may radially pass through a sidewall of the first ring gear part 10. Similarly, second recessed mounting portions 22 and second through holes 23 are formed at the other end, i.e. the second ring gear part 20 of the ring gear 100. The second recessed mounting portion 22 has a mounting surface 24. The radial depth of the recessed mounting portion 22 is equal to or greater than the radial height of the second teeth 21. Preferably, the cross-section of each of the first recessed mounting portions 12 and the second recessed mounting portions 22 is a trapezoid in shape with its outer end greater than its inner end in the axial direction of the ring gear, for facilitating assembly with the flanges. Preferably, the mounting surfaces 14 and 24 are curved. In this embodiment, the number of the first recessed mounting portions 12 and the number of the second recessed mounting portions 22 are both four, and the four first recessed mounting portions 12 and the four second recessed mounting portions 22 are respectively arranged uniformly along a circumferential direction of the ring gear 10.

Figure 8:
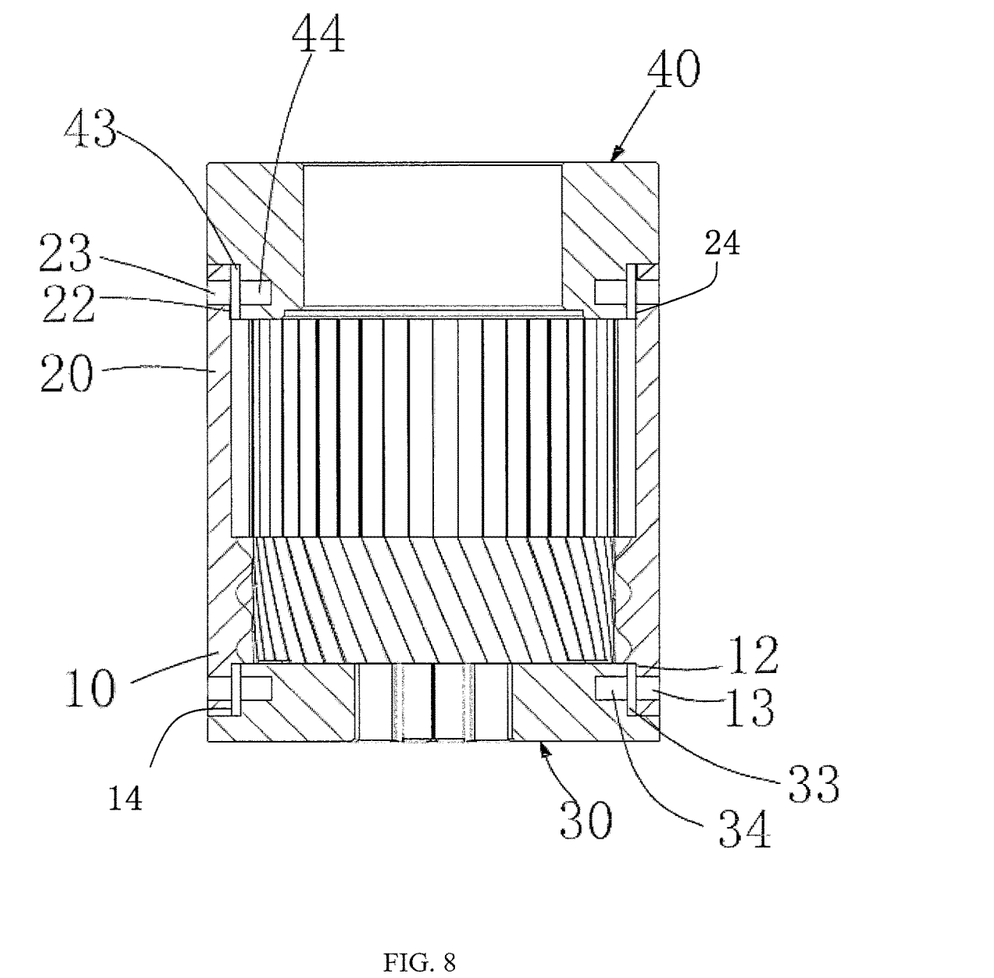
FIG. 8 is a sectional view of the first ring gear part and the second ring gear part of the ring gear of FIG. 6 that are connected with the flanges, respectively.
Figure 9:
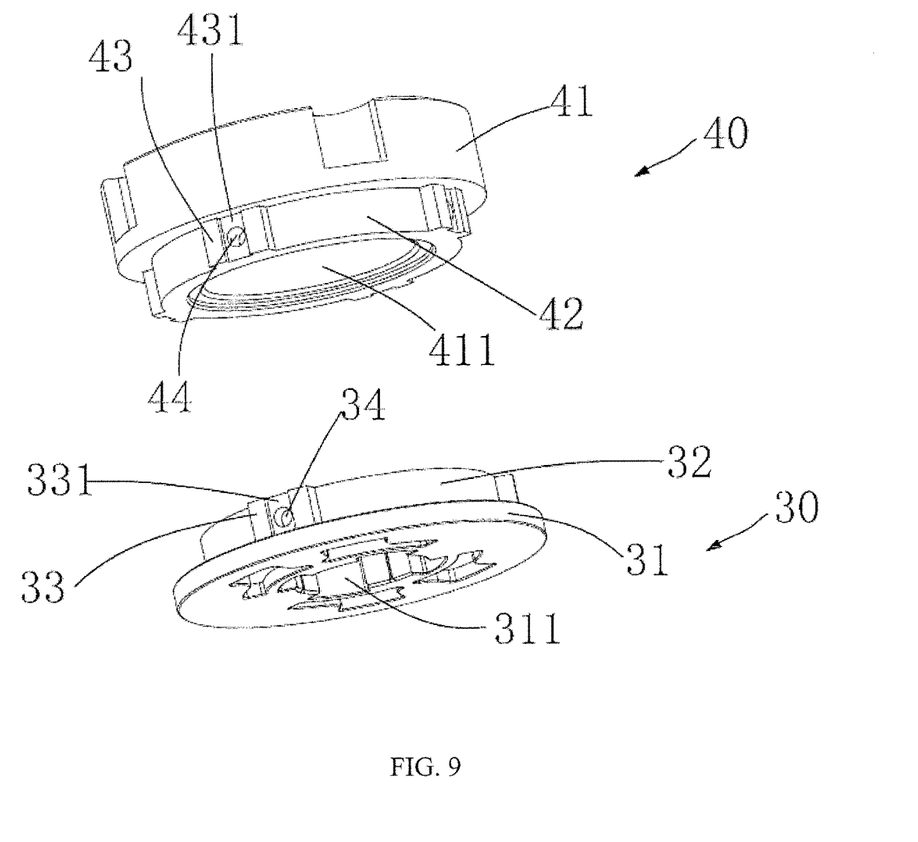
FIG. 9 illustrates the flanges to which the first ring gear part and the second ring gear part of FIG. 8 are connected.

Referring to FIG. 8 and FIG. 9, in describing the connection with the flanges, the flange for connecting with the first ring gear part 10 is referred to as a first flange 30, and the flange for connecting with the second ring gear part 20 is referred to as a second gear 40.

The first flange 30 includes a first flange body 31 and a first connecting portion 32 formed at one end of the first flange body 31. The first connecting portion 32 can be inserted into inside of the first ring gear part 10 of the ring gear 100. The first connecting portion 32 preferably has an annular circumferential surface which is configured to contact with the tips of the first teeth 11 of the first ring gear part 10 to ensure the flange 30 coaxial with the first ring gear part 10. The first flange 30 has an axial first center hole 311 for allowing a driving shaft or a driven shaft to pass therethrough. The first mounting portion 32 has a plurality of first protruding blocks 33 formed on its outer circumferential surface. Each first protruding block 33 is received in one corresponding first recessed mounting portion 12 of the first ring gear part 10 with the outer surface of the block 33 facing the mounting surface 14 of the mounting portion 12. Each first protruding block 33 has a blind hole 34 aligned with the first through hole 13 of one corresponding first recessed mounting portion 12, for allowing a pin to pass therethrough so as to connect the first ring gear part 10 and the first flange 30 together.

The first through holes 13 may be drilled or punched after the mounting surface 14 is integrally formed with the first teeth 11, which may result in burr around the first through holes 13. In this regard, each first protruding block 33 provides a recessed area adjacent to the blind hole 34, so as to prevent interference between the burr and the first protruding block 33. In this embodiment, the recessed area is a vertical groove 331 located at opposite sides of the blind hole 34. In connecting the first flange 30 to the first ring gear part 10, the burr of the first through hole 13 of the first ring gear part 10 may be received in the vertical groove 331, and does not interference with a fastener such as a pin when the pin is plugged into the holes 13 and 34.

The second flange 40 is constructed in a fashion similar to the first flange 30, which includes a second flange body 41 and a second mounting portion 42 formed at one end of the second flange body 41. The second flange body 41 has an axial second center hole 411 for allowing a driven shaft to pass therethrough. The second mounting portion 42 is preferably annular, with a plurality of second protruding blocks 43 formed on its outer circumferential surface. Each second protruding block 43 is formed with a recessed area, such as a vertical groove 431, at opposite sides of the second through hole 44. In connecting the second flange 40 to the second ring gear part 20, each second protruding block 43 is received in one corresponding second recessed mounting portion 22 of the second ring gear part 20 with the outer surface of the block 43 facing the mounting surface 24 of the mounting portion 22 and the burr of the second through hole 23 of the second ring gear part 20 may be received in the vertical groove 431, and to avoid interference with a fastener such as a pin when the pin is plugged into the holes 23 and 44. The second connecting portion 42 preferably has a round circumferential surface which is configured to contact with the tips of the second teeth 21 of the second ring gear part 20 to ensure the flange 40 coaxial with the second ring gear part 20.

Figure 10:
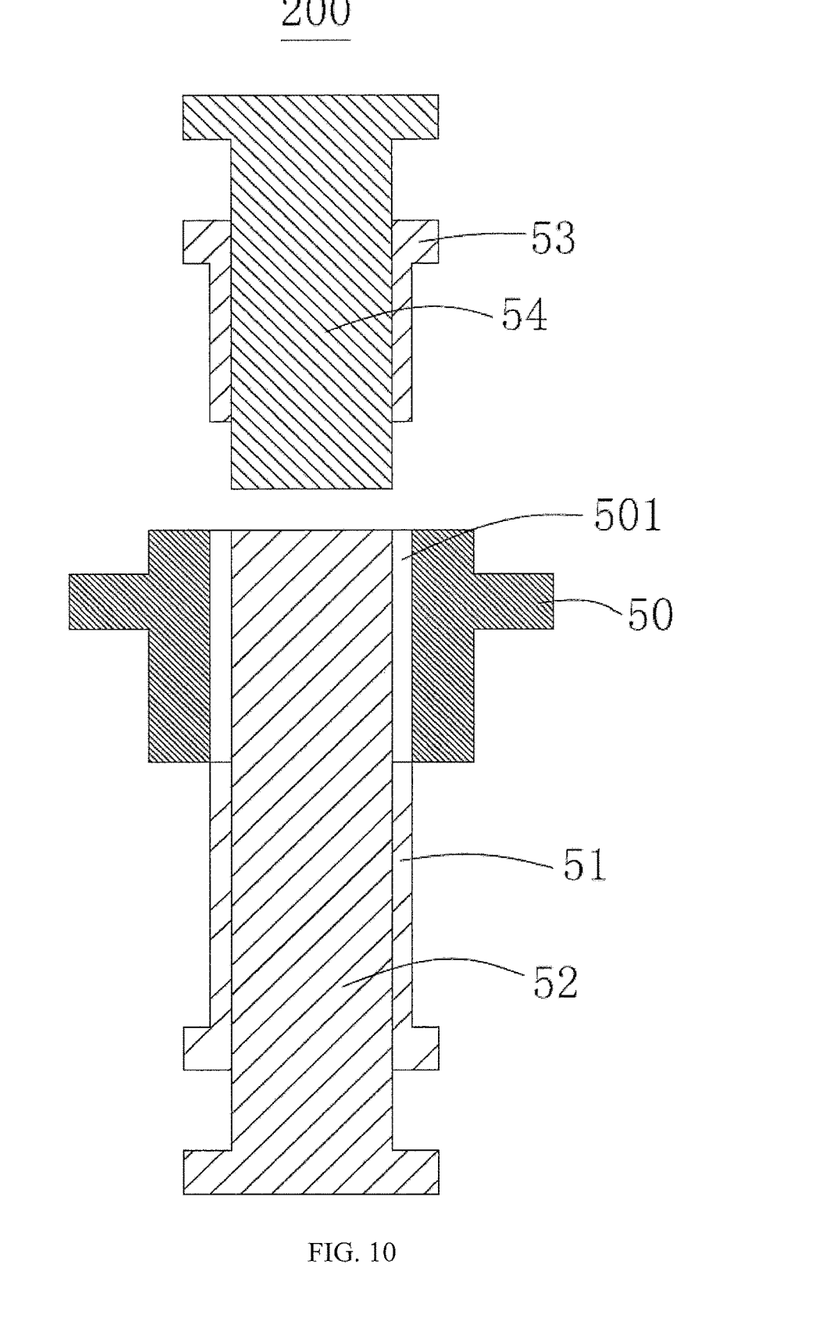
FIG. 10 is a sectional view of a mold for forming the ring gear of FIG. 1.

FIG. 10 illustrates a mold 200 for forming the ring gear 100 of the present invention. The mold 200 includes an intermediate mold 50, an upper punch and a lower punch. The intermediate mold 50 includes a mold cavity 501. The lower punch includes a first lower hollow punch body 51 and a second lower punch body 52 received in the first lower punch body 51. The upper punch includes a first upper hollow punch body 53 and a second upper punch body 54 received in the first upper punch body 53. An outer diameter of the first lower punch body 51 and an outer diameter of the first upper punch body 53 match with an inner diameter of the mold cavity 501 of the intermediate mold 50. An outer diameter of the second lower punch body 52 is equal to an outer diameter of the second upper punch body 54. Each of the second lower punch body 52 and the second upper punch body 54 is formed with external teeth. The ring gear 100 is formed by compressing metal powder filled in the mold cavity 501 of the intermediate mold 50. The forming temperature may be normal/environmental temperature or slightly higher than the normal/environmental temperature (lower than 200 Celsius degrees)

During the compressing process, the second upper mold body 54 may be extended to a preset position within the mold cavity 501 of the intermediate mold 50, and push the second lower punch body 52 outwardly a distance. During the powder metallurgy and compressing process, the first upper punch body 53 may be threadedly inserted into the mold cavity 501 to compress the filled powder. After the compressing process, the upper punch and the lower punch are sequentially demolded, thereby accomplishing the forming of the ring gear 100.

Preferably, an outer surface of the second upper punch body 54 may be formed with helical teeth having a tooth profile corresponding to that of the first teeth 11. An inner surface of the first upper punch body 53 may be also formed with helical teeth which mesh with the helical teeth of the second upper punch body 54.

An inner surface of the first lower punch body 51 may be formed with straight teeth or helical teeth, and an outer surface of the second lower punch body 52 may be formed with straight teeth or helical teeth having a tooth profile corresponding to that of the second teeth 21.

The ring gear 100 of the present invention is formed in a single mold cavity using the powder metal and compressing process, and the fabrication process is simple and reliable. In addition, there is no connection mark between the first annular body of the first ring gear part 10 and the second annular body of the second ring gear part 20, and the annular body of the ring gear 10 has a smooth outer circumferential surface with no boundary line formed thereon.

The ring gear may be formed by compressing in a single step at a relatively lower temperature (such as lower than 200 Celsius degrees). In this case, a maximum size of long sides of the pores between powder metallurgy particles of the sintered ring gear 100 is less than 0.2 mm, and the density of the ring gear 100 is less than 92% of its theoretical density.

Figure 11:
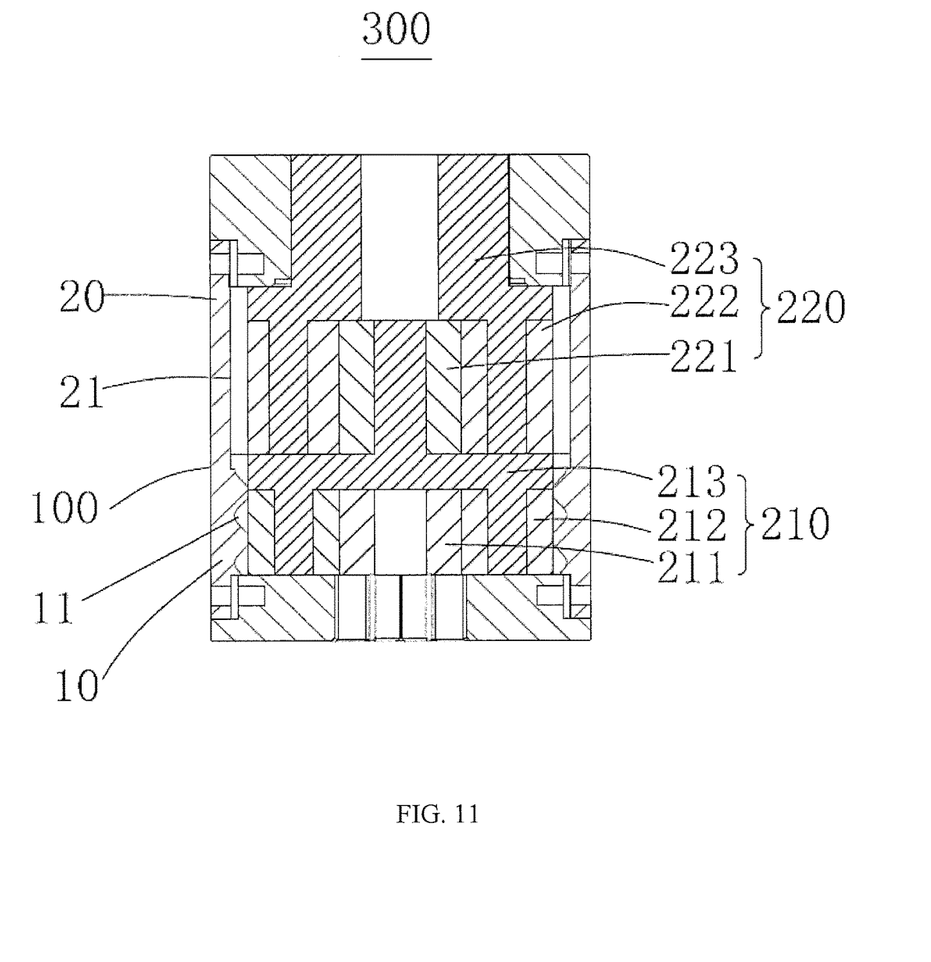
FIG. 11 is a sectional view of the gear reduction device that employs the ring gear of the present invention.

FIG. 11 illustrates a gear device 300 employing the ring gear of the present invention. The gear device 300 is preferably a planetary gear reduction device which includes a ring gear 100, a first planetary gear train 210, and a second planetary gear train 220. The first planetary gear train 210 and the second planetary gear train 220 are disposed within the ring gear 100. The ring gear 100 includes a first ring gear part 10 and a second ring gear part 20. The first ring gear part 10 has first teeth 11 on its inner circumferential surface, and the second ring gear part 20 has second teeth 21 on its inner circumferential surface.

The first planetary gear train 210 includes a first sun gear 211, a first planetary gear set 212, and a first carrier 213. An outer circumferential surface of the first sun gear 211 includes first external teeth. Each planetary gear of the first planetary gear set 212 meshes with both of the first external teeth and the first teeth 11. As such, once the first sun gear 211 rotates, each planetary gear of the first planetary gear set 212 revolves both about its own axis and the first sun gear 211 so as to drive the first carrier 213.

The second planetary gear train 220 includes a second sun gear 221, a second planetary gear set 222, and a second carrier 223. The second sun gear 221 is fixed on the first carrier 213 and is rotatable along with the first carrier 213.

An outer circumferential surface of the second sun gear 221 includes second external teeth. Each planetary gear of the second planetary gear set 222 meshes with both of the second external teeth and the second teeth 21. Once the second sun gear 221 rotates, each planetary gear of the second planetary gear set 222 revolves both about its own axis and the second sun gear 221 so as to drive the second carrier 223. With the use of the ring gear 100 of the present invention, the gear reduction device 300 has a reduced axial size, improved concentricity as well as more compact construction. The gear reduction device 300 may be driven by a motor and then to drive power liftgates of vehicles.

Although the invention is described with reference to one or more embodiments, the above description of the embodiments is used only to enable people skilled in the art to practice or use the invention. It should be appreciated by those skilled in the art that various modifications are possible without departing from the spirit or scope of the present invention. The embodiments illustrated herein should not be interpreted as limits to the present invention, and the scope of the invention is to be determined by reference to the claims that follow.

The invention claimed is:

1. A gear device comprising:
   a first planetary gear train including a first sun gear, a first planetary gear set surrounding the first sun gear, and a first carrier that is driven by revolution of the first planetary gear set about the first sun gear;
   a second planetary gear train including a second sun gear, a second planetary gear set surrounding the second sun gear, and a second carrier that is driven by revolution of the second planetary gear set about the second sun gear;
   a ring gear comprising a first ring gear part that comprises a first annular body and a plurality of first teeth formed on a surface of the first annular body; and a second ring gear part that comprises a second annular body and a plurality of second teeth formed on a surface of the second annular body; wherein the first ring gear part and the second ring gear part are integrally formed from powder metal, the ring gear has a density that is less than 92% of its theoretical density and in a range of 6.0 to 8.0 grams per cubic centimeter; and
   a flange mounted to an end of the ring gear, wherein the flange comprises a flange body abutting the end of the ring gear, and a connecting portion extending from the flange body and being inserted into inside of the ring gear, and the connecting portion has a round circumferential surface configured to contact with tips of the teeth of the ring gear;
   the first planetary gear train and the second planetary gear train disposed within the ring gear, each planetary gear of the first planetary gear set meshing with both of the first sun gear and the first teeth of the ring gear, and each planetary gear of the second planetary gear set meshing with both of the second sun gear and the second teeth of the ring gear.

2. The gear device of claim 1, wherein one of the first annular body and the second annular body forms a plurality of recessed mounting portions, the connecting portion forms a plurality of engaging portions protruding from an outer circumferential surface thereof, and the protruding engaging portions are respectively received in the recessed mounting portions.

* * * * *